US010599980B2

(12) United States Patent
Anderson et al.

(10) Patent No.: US 10,599,980 B2
(45) Date of Patent: Mar. 24, 2020

(54) TECHNOLOGIES FOR COGNITIVE CUING BASED ON KNOWLEDGE AND CONTEXT

(71) Applicant: Intel Corporation, Santa Clara, CA (US)

(72) Inventors: Glen J. Anderson, Beaverton, OR (US); Jose K. Sia, Jr., Portland, OR (US); Kathy Yuen, Portland, OR (US); Shilpa A. Sodani, Portland, OR (US); Bradley A. Jackson, Hillsboro, OR (US); Omesh Tickoo, Portland, OR (US); Nafisa A. Chowdhury, Hillsboro, OR (US); Margaret E. Morris, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 14/976,524

(22) Filed: Dec. 21, 2015

(65) Prior Publication Data

US 2017/0178001 A1 Jun. 22, 2017

(51) Int. Cl.
*G06N 5/02* (2006.01)
*H04L 29/08* (2006.01)

(52) U.S. Cl.
CPC .............. *G06N 5/02* (2013.01); *H04L 67/18* (2013.01); *H04L 67/22* (2013.01); *H04L 67/306* (2013.01)

(58) Field of Classification Search
None
See application file for complete search history.

(56) References Cited

U.S. PATENT DOCUMENTS

| 9,886,493 | B2 * | 2/2018 | Coleman | G06F 16/24578 |
| 2004/0030531 | A1 * | 2/2004 | Miller | A61B 5/0002 702/182 |
| 2007/0055166 | A1 * | 3/2007 | Patil | A61B 5/0002 600/509 |
| 2010/0064010 | A1 * | 3/2010 | Alkov | G09B 5/06 709/206 |
| 2014/0171039 | A1 * | 6/2014 | Bjontegard | H04W 4/029 455/414.1 |
| 2014/0204115 | A1 * | 7/2014 | Rogers | G05B 13/0265 345/619 |
| 2014/0279733 | A1 * | 9/2014 | Djugash | G06N 99/005 706/12 |
| 2015/0066284 | A1 * | 3/2015 | Yopp | B60W 30/00 701/29.2 |

(Continued)

OTHER PUBLICATIONS https://web.archive.org/web/20151213164956/https://en.wikipedia.org/wiki/Biometrics Definition of "Biometrics" from Wikipedia (Year: 2015).*

(Continued)

*Primary Examiner* — Alan Chen
(74) *Attorney, Agent, or Firm* — Barnes & Thornburg LLP

(57) ABSTRACT

Technologies for providing cues to a user of a cognitive cuing system are disclosed. The cues can be based on the context of the user. The cognitive cuing system communicates with a knowledge-based system which provides information based on the context, such as the name of a person and the relationship the user of the cognitive cuing system has with the person. The cues can be provided to the user of the cognitive cuing system through visual, auditory, or haptic means.

19 Claims, 10 Drawing Sheets

(56) References Cited

U.S. PATENT DOCUMENTS

| | | | | |
|---|---|---|---|---|
| 2015/0148707 A1* | 5/2015 | Bedingham | ............ | A61B 7/04 |
| | | | | 600/586 |
| 2016/0041535 A1* | 2/2016 | Leonardi | ................ | G05B 13/04 |
| | | | | 700/29 |
| 2016/0066838 A1* | 3/2016 | DeCharms | ........... | A61B 5/4824 |
| | | | | 434/236 |
| 2017/0010667 A1* | 1/2017 | Tanaka | ..................... | G06F 1/163 |
| 2017/0039877 A1* | 2/2017 | Gimenez Molinelli | ..................... | |
| | | | | G06F 19/34 |
| 2017/0095382 A1* | 4/2017 | Wen | ..................... | G06F 19/3418 |
| 2017/0340261 A1* | 11/2017 | Torres | ................. | A61B 5/1101 |
| 2018/0286272 A1* | 10/2018 | McDermott | ........... | A61B 5/744 |

OTHER PUBLICATIONS

"A Joint Model of Language and Perception for Grounded Attribute Learning," Cynthia Matuszek, Nicholas FitzGerald, Zettlemoyer, Luke, Bo, Liefeng, Dieter Fox, Proceedings of the International Conference on Machine Learning (ICML), 2012.

Yi Chu, Young Chol Song, Richard Levinson, and Henry Kautz (2012). Interactive Activity Recognition and Prompting to Assist People with Cognitive Disabilities. Journal of Ambient Intelligence and Smart Environments, 4(5) 2012, pp. 443-459.

\* cited by examiner

US 10,599,980 B2

TECHNOLOGIES FOR COGNITIVE CUING BASED ON KNOWLEDGE AND CONTEXT

BACKGROUND

Personal computing devices are quickly becoming ubiquitous tools for the average consumer. Personal computing devices, such as smart phones, wearable computing devices, smart glasses, tablet computers, and the like, may be used for a variety of purposes including work, entertainment, and information research. As personal computing devices become more ingrained into the everyday life of users, alternative or additional capabilities of the personal computing devices are becoming ever more important. For example, a Global Positioning Satellite (GPS) chip combined with a maps program can assist a user who may be lost.

Knowledge representation and automated reasoning can be used to improve the capabilities of personal computing devices. For example, systems now exist that can represent information related to a user (such as an e-mail discussing an upcoming event), and can infer that the user may be attending that event. The knowledge represented and associated with a user may additionally be related to family, friends, past experiences, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
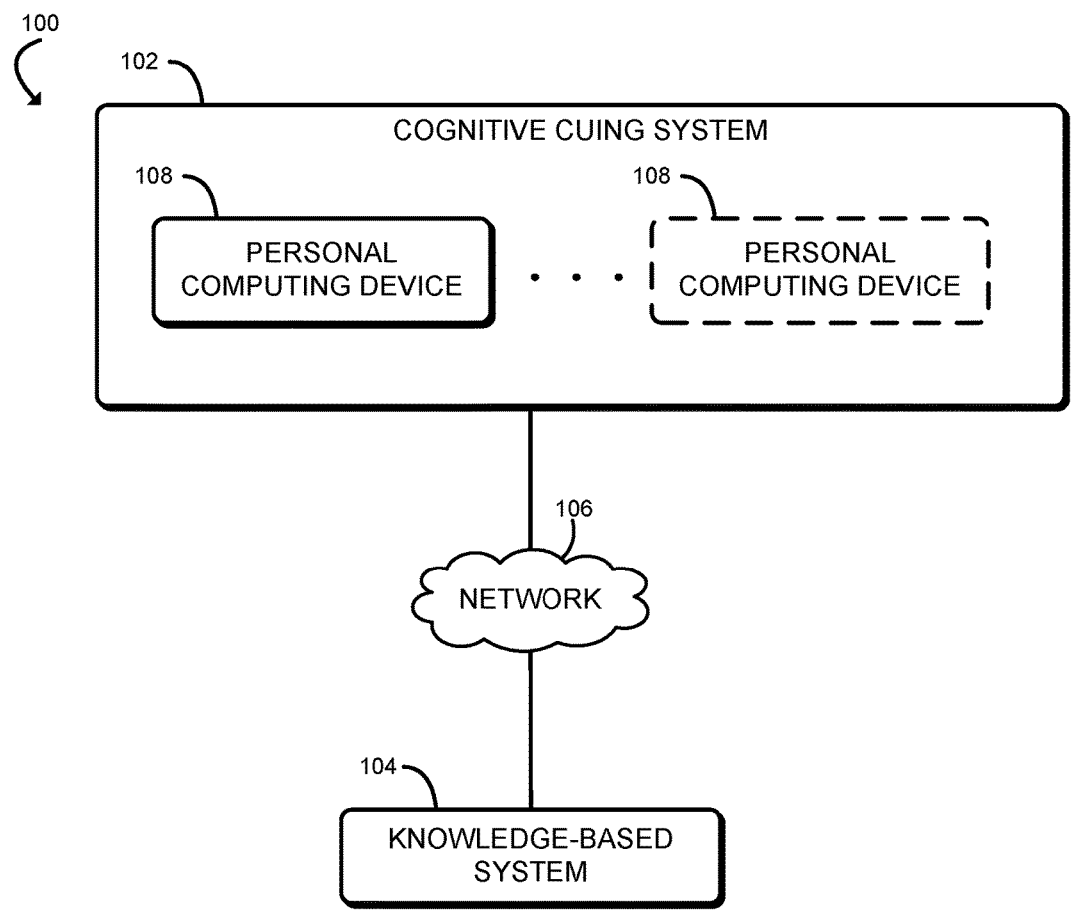
FIG. 1 is a simplified block diagram of at least one embodiment of a system for knowledge representation and cognitive cuing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for knowledge representation and cognitive cuing includes a cognitive cuing system 102 and a knowledge-based system 104 in communication over a network 106. The cognitive cuing system 102 includes one or more personal compute devices 108. As described in more detail below, each personal compute device 108 may be embodied as, for example, a mobile computing device such as a mobile phone or a wearable computing device such as smart glasses with a heads-up display. In use, the cognitive cuing system 102 is configured to aggregate contextual information related to a user and provide the user with various cues based on the context of the user. Such cues may be any type of informational cue that may be useful to the user in the present context. For example, the cues may include conversational topic cues, social cues, reminder cues, and/or the like. According to one use case, for example, a user of the cognitive cuing system 102 may be mentally impaired (e.g., as a result Alzheimer's), and require information related to his current situation, such as the name of the person with whom he is speaking. The cognitive cuing system 102 is configured to gather or capture data relating to a context of the user of the cognitive cuing system 102, such as an image of a person speaking with the user, and provide cues to the user regarding the person's name. In this example, the cognitive cuing system 102 may identify the person speaking to the user using facial recognition or similar technology.

To facilitate the determination of the cues, the cognitive cuing system 102 may request information from the knowledge-based system 104 based on the context of the user, and receive cue information in response, such as the identity of the person and/or the relationship of the person to the user. In addition to providing information explicitly requested, the knowledge-based system 104 may determine other relevant information to provide to the user, such as information obtained through performing automated reasoning on the information stored and/or the context data provided by the cognitive cuing system 102. After receiving the information from the knowledge-based system 104, the cognitive cuing system 102 can then provide a cue (e.g., the name of the person and the relationship of the person with the user) to the user through, for example, the heads-up display on a pair of smart glasses.

In some embodiments, each personal compute device 108 of the cognitive cuing system 102 may capture context data. In other embodiments, one or more of the personal compute devices 108 may only receive context data captured from other personal compute devices 108. For example, one or more wearable computing devices may capture context data, and subsequently send the captured context data to a mobile phone in the user's pocket. In some embodiments, there may be one "primary" personal compute device 108, which all other "secondary" personal compute devices 108 communicate with. In this embodiment, the "primary" personal compute device 108 may be the only device that communicates with the knowledge-based system 104. In other embodiments, the personal compute devices 108 may form a peer-to-peer network, wherein each personal compute device 108 may communicate with each other personal compute device 108, and further each personal compute device 108 may communicate with the knowledge-based system 104. Of course, some embodiments may incorporate aspects of both the master/slave system and the peer-to-peer system.

The cognitive cuing system 102 is configured to communicate with the knowledge-based system 104 over the network 106. The network 106 may be embodied as any type of communication network capable of facilitating communication between the cognitive cuing system 102 and the knowledge-based system 104. The network 106 may be embodied as or otherwise include Ethernet, Bluetooth®, Wi-Fi®, WiMAX, near field communication (NFC), cellular communication, analog communication, serial port communication such as RS-232, etc. In some embodiments, the communication among the personal compute devices 108 may be through the network 106. Additionally or alternatively, the cognitive cuing system 102 may communicate directly with the knowledge-based system 104, without using a network of any kind.

Figure 2:
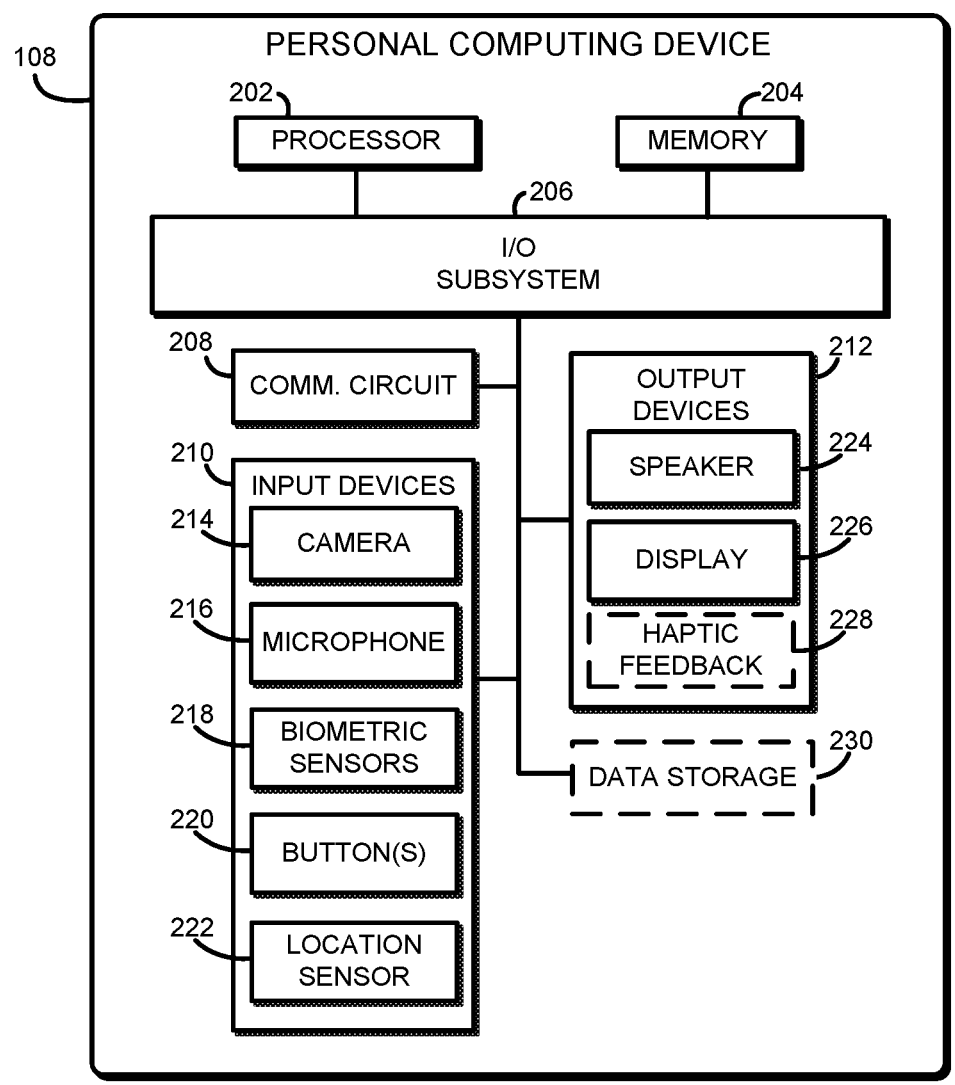
FIG. 2 is a simplified block diagram of at least one embodiment of a personal compute device of a cognitive cuing system of the system of FIG. 1.

Referring now to FIG. 2, each personal compute device 108 may be embodied as any type of computing device capable of performing the functions described herein. For example, the personal compute device 108 may be embodied as or otherwise be included in, without limitation, a smartphone, a cellular phone, a tablet computer, a notebook computer, a laptop computer, a wearable computer, smart eyeglasses, a smart watch, a smart wristband, a head-mounted display unit, an ear-mounted device such as a headset, a brain-computer interface (BCI), a handset, a messaging device, a camera device, a multiprocessor system, a processor-based system, a consumer electronic device, and/or any other computing device. As shown in FIG. 2, the illustrative personal compute device 108 includes a processor 202, a memory 204, an I/O subsystem 206, a communication circuit 208, input devices 210, and output devices 212. In some embodiments, one or more of the illustrative components of the personal compute device 108 may be incorporated in, or otherwise form a portion of, another component. For example, the memory 204, or portions thereof, may be incorporated in the processor 202 in some embodiments. Additionally, in some embodiments, one or more of the personal compute devices 108 of the cognitive cuing system 102 may be implemented in dedicated circuitry to capture sensor data and to transmit the sensor data. Such dedicated circuitry may be analog circuitry, digital circuitry, or some combination thereof, and may not necessarily be able to perform general computing tasks.

The processor 202 may be embodied as any type of processor capable of performing the functions described herein. For example, the processor 202 may be embodied as a single or multi-core processor(s), a single or multi-socket processor, a digital signal processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the personal compute device 108 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the personal compute device 108. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the personal compute device 108, such as the input devices 210, on a single integrated circuit chip.

The communication circuit 208 may be embodied as any type of communication circuit, device, or collection thereof, capable of enabling communications between the personal compute device 108 and other devices such as the knowledge-based system 104 and/or other personal compute devices 108. To do so, the communication circuit 208 may be configured to use any one or more communication technology and associated protocols listed above (e.g., Ethernet, Bluetooth®, Wi-Fi®, WiMAX, NFC, etc.) to effect such communication.

The input devices 210 may be embodied as one or more of any type of device capable of generating data indicative of a context of the user or from which a context of the user may be derived. In the illustrative embodiment, the input devices 210 include a camera 214, a microphone 216, biometric sensors 218, one or more buttons 220, and a location sensor 222 such as a GPS chip. The biometric sensors 218 may employ sensors indicative of a mental state of the user, such as a brain-computer interface (BCI) using functional near-infrared spectroscopy (fNIRS) and the modified Beer-Lambert law, electroencephalography (EEG), magnetoencephalography (MEG), etc.

The output devices 212 may be embodied as any type of device capable of generating an output (e.g., a audible, visual, or tactile output) to the user. In the illustrative embodiment, the output devices 212 include a speaker 224 and a display 226. The speaker 224 in some embodiments may be ear-mounted such as headphones. The display 226 may be embodied as any type of display on which information may be displayed to the user of the personal compute device 108, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology. In some embodiments, the personal compute device 108 may also include a haptic feedback 228, such as by vibrating a portion or all of the personal compute device 108.

Of course, in other embodiments, the personal compute device 108 may include other or additional components, such as those commonly found in a mobile computing device. For example, the personal compute device 108 may also have dedicated data storage 230. The data storage 230 may be embodied as any type of device or devices configured for the short-term or long-term storage of data. For example, the data storage 230 may include any one or more memory devices and circuits, memory cards, hard disk drives, solid-state drives, or other data storage devices.

Figure 3:
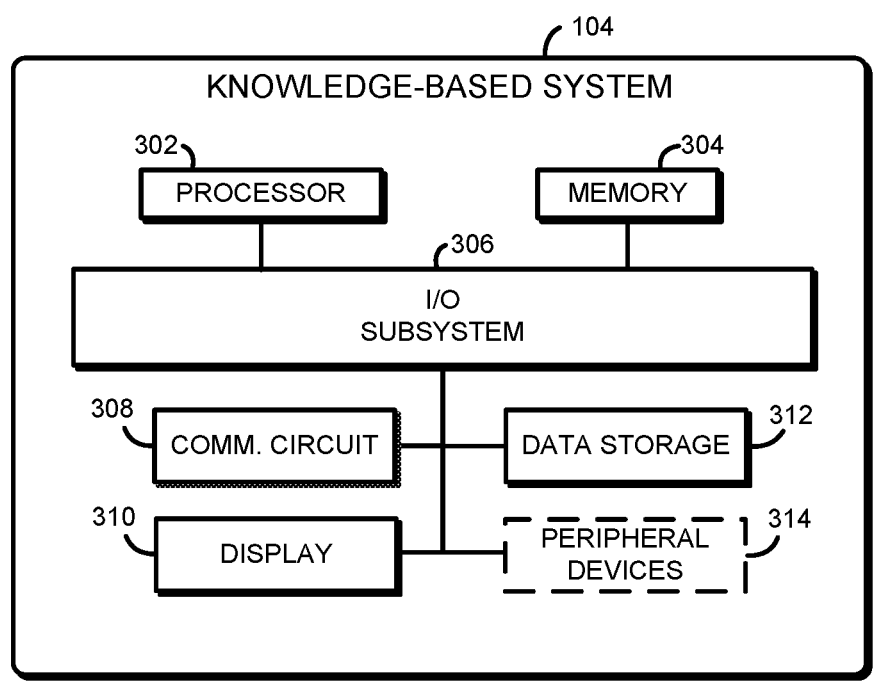
FIG. 3 is a simplified block diagram of at least one embodiment of a knowledge-based system of the system of FIG. 1.

Referring now to FIG. 3, the knowledge-based system 104 may be embodied as any type of server or compute device capable of performing the functions described herein. For example, the knowledge-based system 104 may be embodied as or otherwise be included in, without limitation, a desktop computer, a rack-mounted computer, a smartphone, a cellular phone, a tablet computer, a notebook computer, a laptop computer, a wearable computer, a digital camera, smart eyeglasses, a smart watch, a head-mounted display unit, a handset, a messaging device, a multiprocessor system, a processor-based system, a consumer electronic device, and/or any other computing device capable of performing the function described herein. As shown in FIG. 3, the illustrative knowledge-based system 104 includes a processor 302, a memory 304, an I/O subsystem 306, a communication circuit 308, a display 310, data storage 312, and optional peripheral devices 314. Each of the processor 302, the memory 304, the I/O subsystem 306, the communication circuit 308, the display 310, and the data storage 312 may be similar to the corresponding components of the personal compute device 108. As such, the description of those components of the personal compute device 108 is equally applicable to the description of those components of the knowledge-based system 104 and is not repeated herein for clarity of the description. Of course, the knowledge-based system 104 may include additional peripheral devices 314 not included in the personal compute device 108 (or included as an input device 210 or output device 212), such as a hardware keyboard, printing device, etc. In some embodiments, some or all of the function of the knowledge-based system 104 may be performed by the cognitive cuing system 102, and there may not be a separate knowledge-based system 104.

Figure 4:
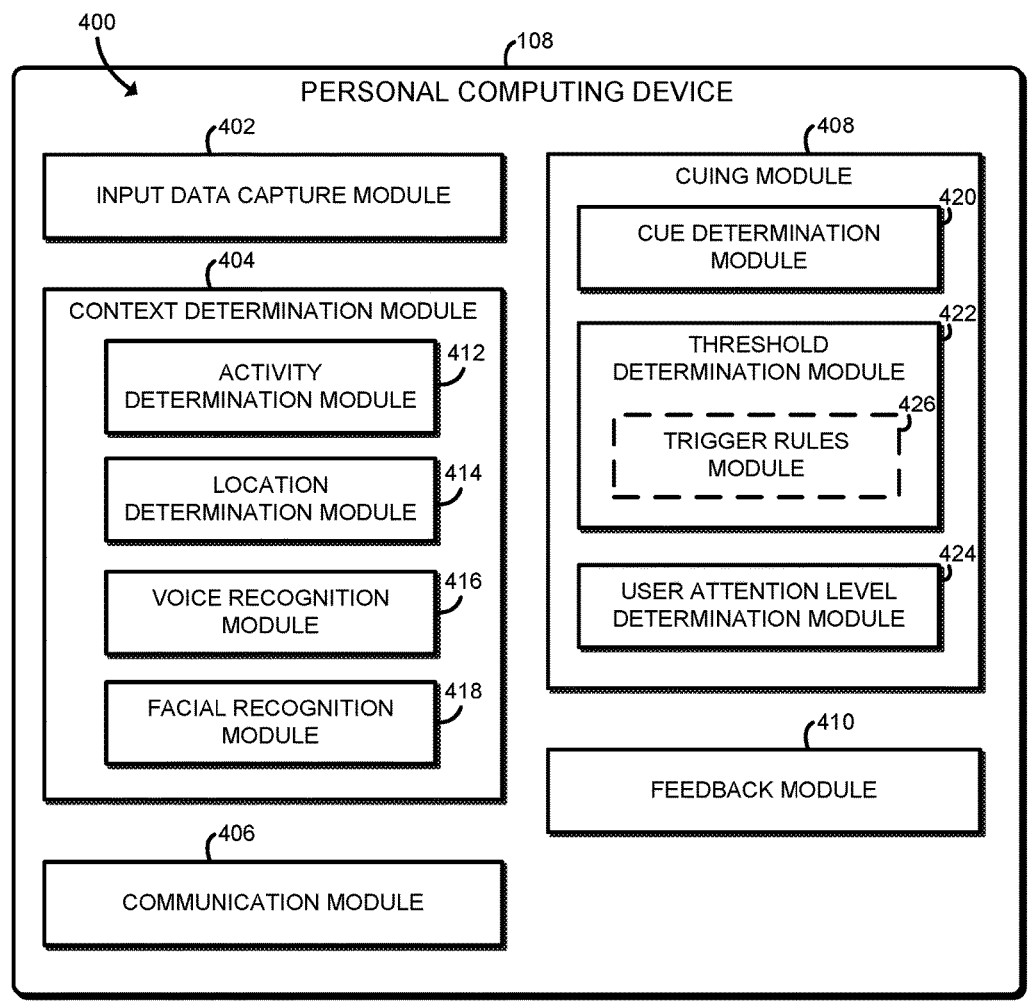
FIG. 4 is a block diagram of at least one embodiment of an environment that may be established by the personal compute device of FIG. 2.

Referring now to FIG. 4, in use, the personal compute device 108 may establish an environment 400. The illustrative environment 400 includes an input data capture module 402, a context determination module 404, a communication module 406, a cuing module 408, and a feedback module 410. The various modules of the environment 400 may be embodied as hardware, software, firmware, or a combination thereof. For example, the various modules, logic, and other components of the environment 400 may form a portion of, or otherwise be established by, the processor 202 or other hardware components of the personal compute device 108. As such, in some embodiments, one or more of the modules of the environment 400 may be embodied as circuitry or collection of electrical devices (e.g., an input data capture circuit 402, a context determination circuit 404, a communication circuit 406, etc.). It should be appreciated that, in such embodiments, one or more of the circuits (e.g., input data capture circuit 402, the context determination circuit 404, the communication circuit 406, etc.) may form a portion of one or more of the processor 202, the memory 204, the I/O subsystem 206, the data storage 230, the input devices 210, the output devices 212, and/or the communication circuitry 208. Additionally, in some embodiments, one or more of the illustrative modules may form a portion of another module and/or one or more of the illustrative modules may be independent of one another.

The input data capture module 402 is configured to capture or otherwise generate input data from the input devices 210. In the illustrative embodiment, the input data capture module 402 captures data from each input device 210 continuously or continually. In some embodiments, the input data capture module 402 may capture data from each input device 210 at different rates, continuously, continually, or periodically. Of course, in some cases, one or more of the input devices 210 may not be used at all at certain times. In some embodiments, the input data capture module 402 may be configured to capture input data from one or more of the input devices 210 only when instructed to by the user or by the personal compute device 108.

The context determination module 404 is configured to determine a context of the user based on various context data obtained or generated by the personal computing device 108. The context of the user may include any type of data indicative of circumstances related to the present environment of the user, such as surroundings, a current location, people nearby, a conversation, sounds, biological indicators of the user, actions of the user, etc. In the illustrative embodiment, the context determination module 404 determines a context of the user based on data received from each input device 210. For example, the context determination module 404 may determine the person whom the user is looking at based on image data received from the camera 214, may determine what is being said based on audio data received from the microphone 216, may determine a context associated with a mental state of the user based on biometric data from the biometric sensors 218, may determine the location of the user based on location data from the location sensor 222, and/or may determine an indicated preference of the user based on input data generated in response to the user pressing the button(s) 220. In some embodiments, the context of the user may be embodied as data captured from an input device 210 without any processing. Additionally, in some embodiments, one personal compute device 108 may determine a context of the user based on input data gathered by another personal compute device 108 of the cognitive cuing system 102. Additionally or alternatively, the personal compute device 108 may determine context data based on information available from other sources. For example, the personal compute device 108 may know or be able to access information related to the user's schedule or list of appointments. In this example, the personal compute device 108 may determine what the user is doing or where he is based at least on part on the user's schedule.

To facilitate the determination of the context of the user, the context determination module 404 illustratively includes an activity determination module 412, a location determination module 414, a voice recognition module 416, and a facial recognition module 418. The activity determination module 412 is configured to determine a current activity of the user based on the input data captured by the input data capture module 402 and/or other data. For example, the activity determination module 412 may determine that the user is a passenger in a car, or the user is driving the car, based on image processing on an image captured by the camera 214.

The location determination module 414 is configured to determine a location of a user based on the input data captured by the input data capture module 402 and/or other data. For example, the location determination module 414 may use location data produced by the location sensor 222. Additionally or alternatively, the location determination module 414 may use signal triangulation or trilateration to determine location data. Such location determination may be based on cellular signal, Wi-Fi hotspots, etc. In some embodiments, the location may be determined based on data available related to the user, such as location of a current item on the user's schedule.

The voice recognition module 416 is configured to perform voice analysis on voice data, for example data captured by the microphone 216. The voice recognition module 416 may recognize the words being spoken in the voice data. Additionally or alternatively, the voice recognition module 416 may be able to determine data relating to speech patterns associated with the voice data that may be used to identify who is speaking. In some embodiments, the personal compute device 108 may use the data relating to speech patterns to identify the speaker. In other embodiments, the personal compute device 108 may communicate with the knowledge-based system 104 in order to identify the speaker based on the voice data or on the data relating to speech patterns. The voice recognition module 416 may, in some embodiments, also be able to identify a tone of voice, volume of voice used, etc.

The facial recognition module 418 is configured to perform facial analysis on image data, for example image data captured by the camera 214. To do so, the facial recognition module 418 may determine which portions of an image contain a face, and additionally may determine data relating to facial features of that face. In some embodiments, the facial recognition module 418 may determine the identity of a person based on the data relating to facial features of the face. Additionally or alternatively, in other embodiments, the personal compute device 108 may communicate with the knowledge-based system 104 in order to identify the face based on the data relating to facial features or some or all of the image data. The facial recognition module 418 may, in some embodiments, be able to extract additional information from the image, such as the direction of the gaze of the person, an emotion associated with the person based on the image data, etc.

The communication module 406 is configured to request information from a knowledge-based system 104 based on the context. In the illustrative embodiment, the communication module 406 sends a query to the knowledge-based system 104 based on the context of the user. For example, the communication module 406 may send an image of a face or data relating to facial features of a person the user is speaking to, and request the identity of the person and information related to this person. The communication module 406 is configured to then receive the requested information from the knowledge-based system 104. In some embodiments, the communication module 406 may send the context of the user to the knowledge-based system 104 without requesting any specific information, but rather requesting information determined by the knowledge-based system 104 to be relevant based on the context of the user, or even without any explicit request for information at all. Additionally or alternatively, the communication module 406 may transmit context or queries to the knowledge-based system 104 continuously, continually, periodically, and/or when so requested by the user. In some cases, the communication module 406 may send a request for information without including any indication of the context of the user.

As discussed above, the communication module 406 may communicate with the knowledge-based system 104 either directly or indirectly through a network 106, using, for example, Ethernet, Bluetooth®, Wi-Fi®, WiMAX, near field communication (NFC), etc. In some embodiments, some or all of the knowledge-based system 104 may be a part of a personal compute device 108, and the communication to the knowledge-based system 104 may then be all within the personal compute device 108 (or between two or more personal compute devices 108 of the cognitive cuing system 102).

The cuing module 408 is configured to determine a cue to be provided to the user and to provide the cue to the user, as described in more detail below. The cuing module 408 includes a cue determination module 420, a threshold determination module 422, and a user attention level determination module 424.

The cue determination module 420 is configured to determine a cue to be provided to the user based on the context of the user and/or the information received from the knowledge-based system 104. For example, if the knowledge-based system 104 has provided the identity of the person to whom the user is speaking and the relationship of that person to the user, the knowledge-based system 104 may determine that a cue to be provided to the user including this information. Of course, the cue determination module 420 may determine that no cue is necessary. For example, if the user has already said the name of the person, the cue determination module 420 may determine that the user does not need the name of that person or the relationship of that person with the user. After determining a cue, the cue determination module 420 adds the cue to a list of cues maintained by the cue determination module 420. The list of cues includes all of the available cues that have not yet been provided to the user. Of course, cues may be removed from the cue list if the cue determination module 420 determines they are no longer needed (e.g., if the user is no longer speaking to the person to whom the cue refers).

The threshold determination module 422 is configured to determine a threshold for each cue on the cue list based on the context of the user. In some cases, the threshold is related to the importance, urgency, or relevance of the cue. For example, the context may indicate that the user is speaking to a person, but has not yet said the name of the person. The threshold determination module 422 may place a medium threshold on the cue of the name of the person, since the user may in fact know the name of the person, even if he has not said it yet. If the context indicates that the user is trying to remember the name of the person, for example by analyzing the conversation or by the user pressing a button so indicating, the threshold determination module 422 may place a low threshold on the cue of the name of the person. Of course, the threshold is not necessarily a single number, but may be embodied as a more complicated data structure indicating a several different aspects or applications of the threshold that can be used in a variety of different situations.

The threshold determination module 422 may include a trigger rules module 426 which is configured to provide rules for determining thresholds. For example, there may be a rule that all thresholds have a minimum value if the user is performing a certain activity, such as driving. In another example, the user may express preferences through the trigger rules, such as to always provide the name of a person the user has not seen in more than a day. In some embodiments, the user preferences may include a goal for cognitive improvement, which may be taken into account for determining the threshold.

The user attention level determination module 424 is configured to determine an attention level of the user. The attention level of the user may be determined based on the context of the user, such as if he or she currently engaged in a conversation, or if there is a pause in that conversation. The attention level of the user may also be determined based on the determined activity of the user. Of course, the user's attention level is not necessarily a single number, but may be embodied as a more complicated data structure indicating several different aspects of the user's attention and/or a certainty of the determined level.

The cuing module 408 is configured to determine, for each cue in the cue list, whether the user attention level satisfies the corresponding threshold. If the user attention level satisfies the threshold for the cue, the cue is provided to the user. In some cases, the user attention level is past the threshold by being higher than the threshold. In other cases, the user attention level is past the threshold by being lower than the threshold. Of course, since each of the threshold and the user attention level can be embodied as a more complicated data structure than a single number, determining if the threshold is past the user attention level may include a more complicated algorithm than simply comparing two numbers. A cue can be provided to the user by, for example, using one or more output devices 212. In the illustrative embodiment, the cue can be provided to the user by an auditory cue using the speaker 224, a visual cue using the display 226, or a haptic cue using the haptic feedback 228. In some embodiments, the cue may be provided by notifying the user further information is available, even if the full content of the cue is not explicitly presented to the user at that time. For example, a smart watch may provide a haptic cue to the user, indicating that further information is available.

The feedback module 416 is configured to monitor the effect providing the cue has on the user. For example, if the cue includes the name of the person the user is speaking to, and the user says the name immediately after the cue is provided, that is an indication that the user did not know the name of the person, and therefore the cue was helpful to the user. In another example, the user may still appear confused even after the name is provided, indicating the cue was not effective.

Figure 5:
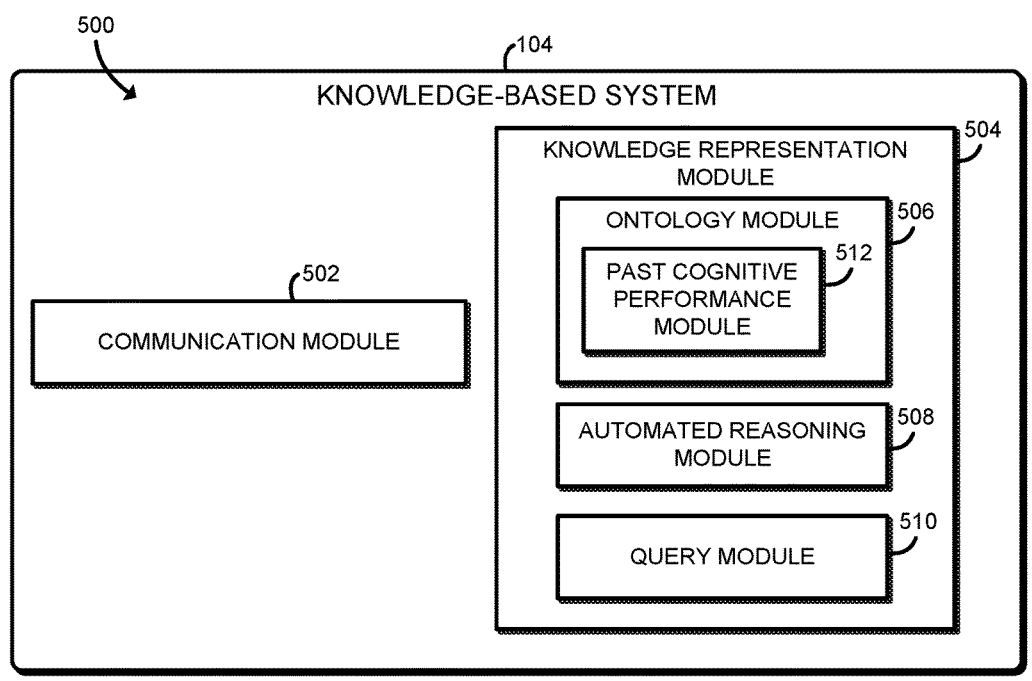
FIG. 5 is a block diagram of at least one embodiment of an environment that may be established by the knowledge-based system of FIG. 3.

Referring now to FIG. 5, in use, the knowledge-based system 104 may establish an environment 500. The illustrative environment 500 includes a communication module 502 and a knowledge representation module 504. The illustrative knowledge representation module 504 includes an ontology module 506, an automated reasoning module 508, and a query module 510. The various modules of the environment 500 may be embodied as hardware, software, firmware, or a combination thereof. For example, the various modules, logic, and other components of the environment 500 may form a portion of, or otherwise be established by, the processor 302 or other hardware components of the knowledge-based system 104. As such, in some embodiments, one or more of the modules of the environment 500 may be embodied as circuitry or collection of electrical devices (e.g., a communication circuit 502, a knowledge representation circuit 504, etc.). It should be appreciated that, in such embodiments, one or more of communication module 502 and/or the knowledge representation module 504 may form a portion of one or more of the processor 302, the memory 304, the I/O subsystem 306, the communication circuitry 308, the display 310, the data storage 312, and/or the peripheral devices 314. Additionally, in some embodiments, one or more of the illustrative modules may form a portion of another module and/or one or more of the illustrative modules may be independent of one another.

The communication module 502 is configured to facilitate communications with the knowledge-based system 104 to receive a request for information based on the context of the user from the personal compute device 108. As described above, the request may include a request for a specific piece of information, may include a general request for information based on the provided context data, or may include the context of the user without an explicit request for information. After the knowledge representation module 504 determines the information as described in more detail below, the communication module 502 sends the information back to the personal compute device 108. As discussed above, the communication module 502 may communicate with the personal compute device 108 either directly or indirectly through a network 106, using, for example, Ethernet, Bluetooth®, Wi-Fi®, WiMAX, near field communication (NFC), etc.

The knowledge representation module 504 is configured to acquire, store, and make accessible information relating to a user of the cognitive cuing system 102. Information may be acquired through any source of information relating to the user, such as context data provided by the cognitive cuing system 102, the user's e-mail address, information entered directly, etc. The knowledge representation module 504 enables a persistent and/or semi-persistent set of rules based on relationships among people, places, and objects in the user's world. For example, the knowledge representation module 504 may receive context data including an image of a person, along with a transcript of a conversation where this person was introduced to the user. The knowledge representation module 504 may then store the identity of this new person and the relationship the user has with him in the ontology module 506. In another example, the knowledge representation module 504 may scan an e-mail sent to the user indicating a time and location of a certain event, which may then be stored in the ontology module 506.

Figure 8:
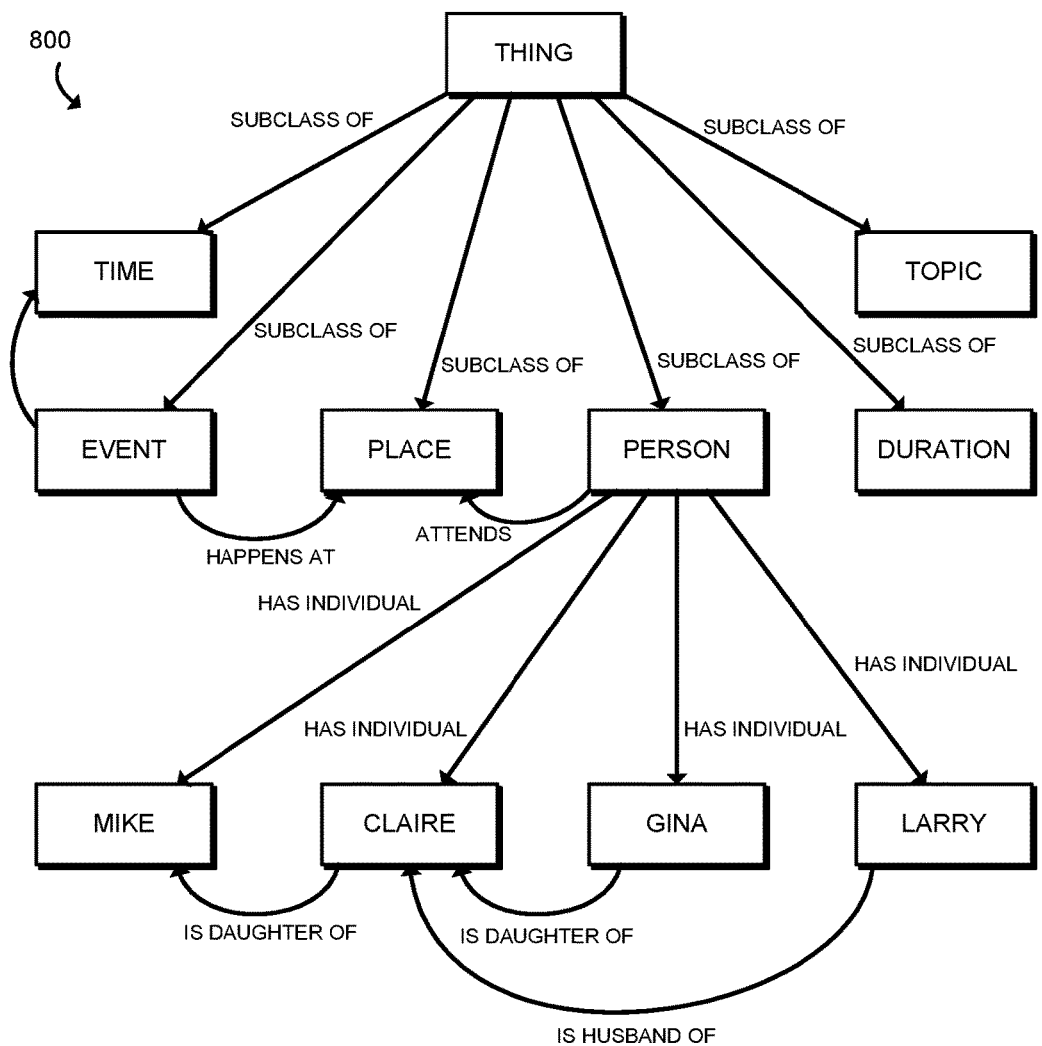
FIG. 8 is a representation of an illustrative entry in an illustrative ontology.

The ontology module 506 stores information relating to the user in an organized and formal manner, and includes data relating to types, properties, and interrelationships of the information stored. A representation of an illustrative entry in an illustrative ontology is depicted in FIG. 8, described in more detail below. The ontology module 506 may be embodied as, or otherwise include, any type of ontology, such as a domain ontology, an upper ontology, or a hybrid ontology. The illustrative ontology module 506 includes a past cognitive performance module 512. The past cognitive performance module 512 tracks the user's cognitive performance over time, including up to the present. For example, the past cognitive performance module 512 tracks how often a user requires cues in certain situations, what level of cue is required to be effective, the degree of challenge of a certain task, and/or how the user's cognitive performance varies with the time of day (i.e., the user's diurnal pattern). Additionally, in some embodiments, the past cognitive performance module 512 can provide information useful for providing diagnostics relating to the user's recent cognitive performance. Such information may, for example, be accessed by the user to help self-awareness, self-understanding, and collaboration with doctors.

The automated reasoning module 508 is configured to reason about the knowledge stored in the ontology module 506, such as by making inferences, asserting new knowledge, etc. To do so, the automated reasoning module 508 may employ any suitable algorithm or analysis on the stored knowledge to infer, interconnect, expand, or otherwise identify connections between individual knowledge pieces.

The query module 510 is configured to process the requests for information from the personal compute device 108. The query module 510 may use both the ontology module 506 and the automated reasoning module 508 to determine the information that is to be provided to the personal compute device 108. To so, the query module 510 may first determine what information is being requested by the personal compute device 108, and may then search the ontology module 506 for the relevant information, and may also submit the request to the automated reasoning module 508 to infer information related to the request based on information currently available.

Figure 6A:
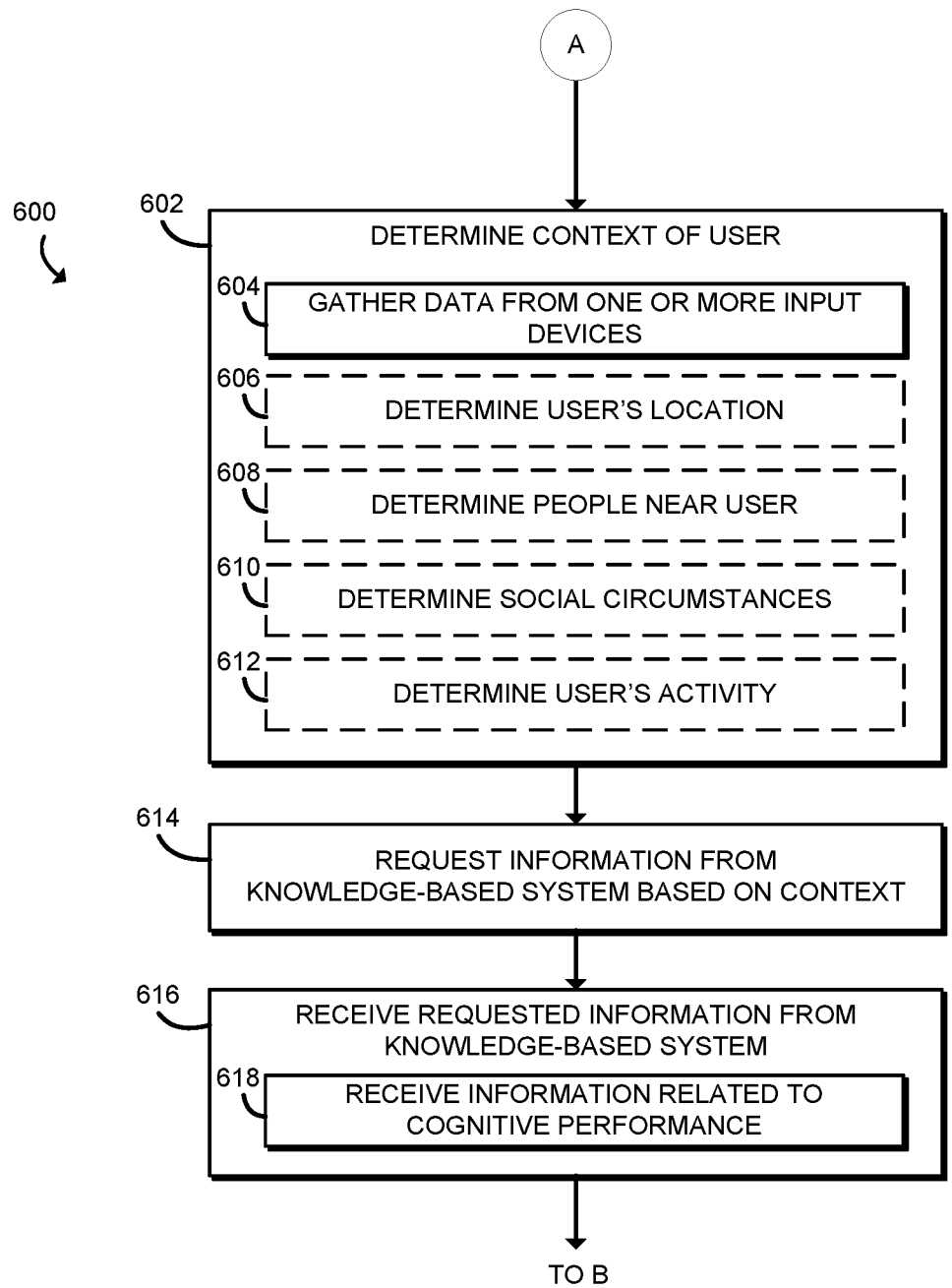
FIGS. 6A-6C are a simplified flow diagram of at least one embodiment of a method for providing a cognitive cue to a user of the cognitive cuing system of FIG. 1 that may be executed by the cognitive cuing system of FIG. 1.
Figure 6B:
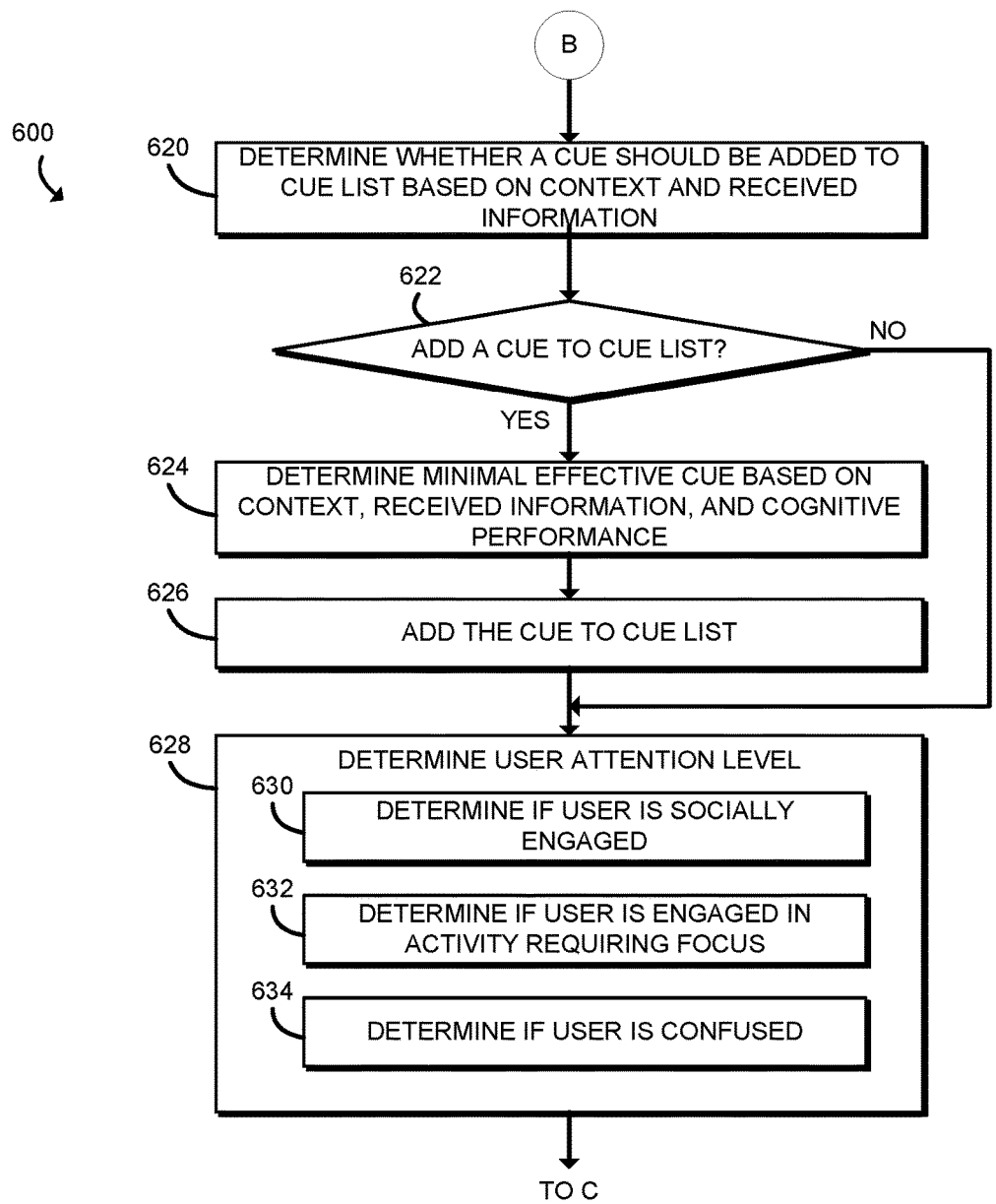
Figure 6C:
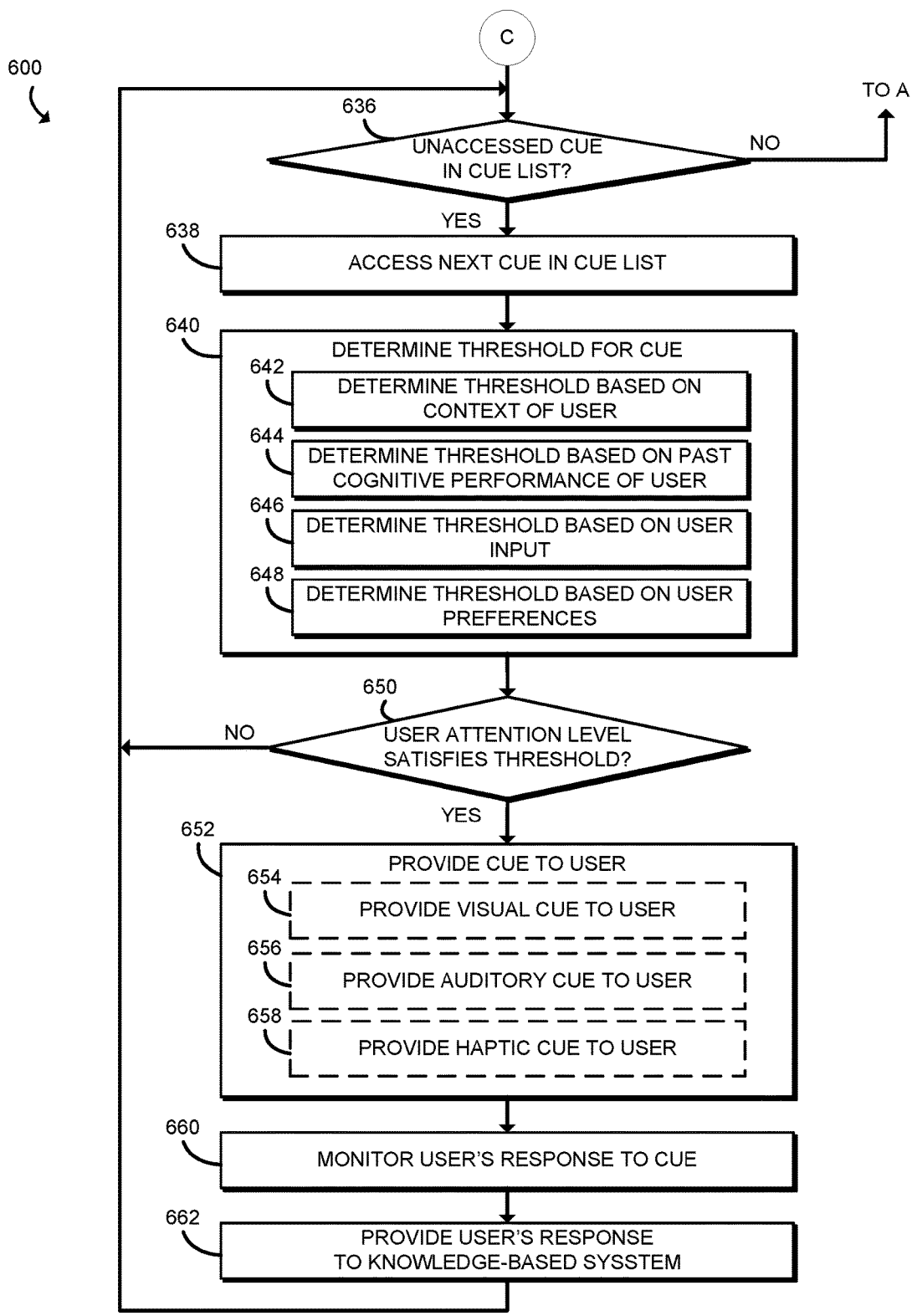

Referring now to FIGS. 6A-6C, in use, the cognitive cuing system 102 may execute a method 600 for cuing a user of the cognitive cuing system 102. The method 600 begins with block 602 in FIG. 6A in which the cognitive cuing system 102 determines a context of the user. To do so, in block 604, the cognitive cuing system 102 gathers, captures, or otherwise obtains context data from one or more input devices 210 and determines the user's context based on such obtained context data. The cognitive cuing system 102 may utilize any suitable data to facilitate the determination of the user's context. For example, in block 606, the cognitive cuing system 102 may determine the user's location by, for example, using the location sensor 222. Additionally or alternatively, in block 608, the cognitive cuing system 102 may determine the identity of the people near the user by, for example, using voice or face recognition. Further, in block 610, the cognitive cuing system 102 may determine the social circumstances of the user. For example, the cognitive cuing system 102 may determine whether the user is engaged in conversation, if he is visiting another person's house, etc. Furthermore, in block 612, the cognitive cuing system 102 may determine the user's current activity. For example, the cognitive cuing system 102 may determine that the user is currently driving, on a bus, preparing a meal, etc. Of course, the context data may also be embodied as, or otherwise include, an input explicitly provided by the user, such as by pressing a button. In some embodiments, the press of a button by the user may indicate that the user desires general information, such as where he is, what people are nearby, what has happened recently, etc. Although illustrative context data has been discussed herein, it should be appreciated that the cognitive cuing system 102 may utilize additional or other data in other embodiments to determine a context of the user.

In block 614, the cognitive cuing system 102 requests information from a knowledge-based system 104 based on the context of the user. In some cases, the request will be for specific information. In other cases, the request may be for general information related to the context provided. In some embodiments, the cognitive cuing system 102 may provide context to the knowledge-based system 104 continuously, continually, or periodically, and may never explicitly request information. In at least those embodiments, merely providing the context to the knowledge-based system 104 can be considered requesting information from the knowledge-based system 104. Of course, in some embodiments, information may also be requested based on data different from the context data, such as from data stored in the cognitive cuing system 102. In some cases, the cognitive cuing system 102 may not provide all of the available context data to the knowledge-based system 104. In such cases, the cognitive cuing system 102 may decide what context data to provide based on time of day, available network connections, and/or an evaluation of the quality, relevance, novelty, or other aspect of the context data.

In block 616, the cognitive cuing system 102 receives the information from the knowledge-based system 104. As described in more detail below in regard to FIG. 7, the information may include relational information and user preferences. In some cases, the cognitive cuing system 102 may receive information related to cognitive performance of the user, as shown in block 618. As discussed in more detail above, the user's past cognitive performance may indicate the types of challenges the user typically struggles with, to what degree, and/or how often. Of course, in some embodiments, such as when the context data is provided continuously without any explicit information request, the cognitive cuing system 102 may not receive a response from the knowledge-based system 104.

After information has been received from the knowledge-based system 104, the method 600 proceeds to block 620 in FIG. 6B. In block 620, the cognitive cuing system 102 determines whether a cue should be added to the cue list to be provided to the user based on the context and/or the received information, which may include the past cognitive performance. For example, if the context of the user indicates that the user is talking to a person, the information includes the name of the person, and the past cognitive performance indicates the user typically struggles to remember that person's name, the cognitive cuing system 102 may determine that a cue should be created. In contrast, if the past cognitive performance indicates the user rarely or never struggles to remember that person's name, the cognitive cuing system 102 may determine that a cue should not be created.

In block 622, the cognitive cuing system 102 decides to proceed to block 624 if a cue is to be added to the cue list. If a cue is not to be added to the cue list, the method 600 jumps to block 628. In block 624, the cognitive cuing system 102 determines a minimal effective cue. For example, if the cognitive cuing system 102 can provide both the name of the person to whom the user is speaking as well as the relationship of that person to the user, the cognitive cuing system 102 may determine, based in part of the user's past cognitive performance, that the user only requires the name of the person. In contrast, if the user's past cognitive performance indicates that the user benefits from more details being provided in such a situation, the cognitive cuing system 102 may include additional details in the cue, such as the relationship of the person with the user. In some embodiments, more than one cue may be added, wherein the different cues include different information and have different thresholds. For example, one cue may contain the person's name and have a low threshold, while another cue may contain the person's name and relationship to the user and have a high threshold. In block 626, the cognitive cuing system 102 adds the cue to the cue list.

In block 628, the cognitive cuing system 102 determines a user's attention level. To do so, the cognitive cuing system 102 may determine the attention level of the user based on the user's present context. For example, the cognitive cuing system 102 may determine in block 630 if the user is socially engaged (e.g., having a conversation), may determine in block 632 if the user in engaged in an activity requiring focus (e.g., driving a car), and/or may determine in block 634 if the user is confused (e.g., by analyzing the biometric data, and/or by determining if the user made an error, such as a social error in a social setting or a navigational error while driving or otherwise navigating).

After the attention level of the user is determined in block 620, the method advance to block 636 of FIG. 6C. Beginning in block 636, the cognitive cuing system 102 iterates over every cue in the cue list. To do so, the cognitive cuing system 102 determines if there are any cues in the cue list that have not yet been accessed in the current iteration of the cue list. If there are, the method 600 proceeds to block 638. If not, the method 600 returns to block 602 of FIG. 6A in which the cognitive cuing system 102 determines the present context of the user. In block 638, the cognitive cuing system 102 accesses the next cue in the cue list.

In block 640, the cognitive cuing system 102 determines the threshold for the next cue. As stated above, the threshold may be indicative of the importance, urgency, or relevance of the cue. As part of determining the threshold, the cognitive cuing system 102 considers the context of the user in block 642, the past cognitive performance of the user in block 644, user input such as a button press in block 646, and user preferences in block 648. In some embodiments, the user preferences may have been previously provided to the knowledge-based system 104, and be included in the information received from the knowledge-based system 104 in block 616. Additionally or alternatively, the information received from the knowledge-based system 104 may indicate that a user has requested a specific reminder at a specific time, place, or situation. In such a case, the reminder the user requested may be taken into account as relevant to the cue in determining the threshold.

In block 650, the cognitive cuing system 102 determines if the user attention level is satisfies a corresponding threshold for the present cue. If it does, the method 600 proceeds to block 652. If not, however, the method 600 returns to block 636 in which the cognitive cuing system 102 determines whether there are any remaining unaccessed cues in the cue list.

In block 652, the cognitive cuing system 102 provides the cue to the user. The cue may be provided to the user in any form or manner. For example, in some embodiments, the cognitive cuing system 102 provides the cue to the user by providing a visual cue to the user in block 654 (e.g., by displaying information on a display), an auditory cue to the user in block 656 (e.g., by annunciating the information), and/or a haptic cue to the user in block 658 (e.g., by providing a vibration to alert the user).

In block 660, the cognitive cuing system 102 monitor's the user's response to the cue, such as if it provides too little information to help the user, the right amount of information to help the user, or more information than the user required. In block 662, the cognitive cuing system 102 provides the user's response to the knowledge-based system 104. The method 600 then proceeds back to block 636 to consider the next cue in the cue list.

Figure 7:
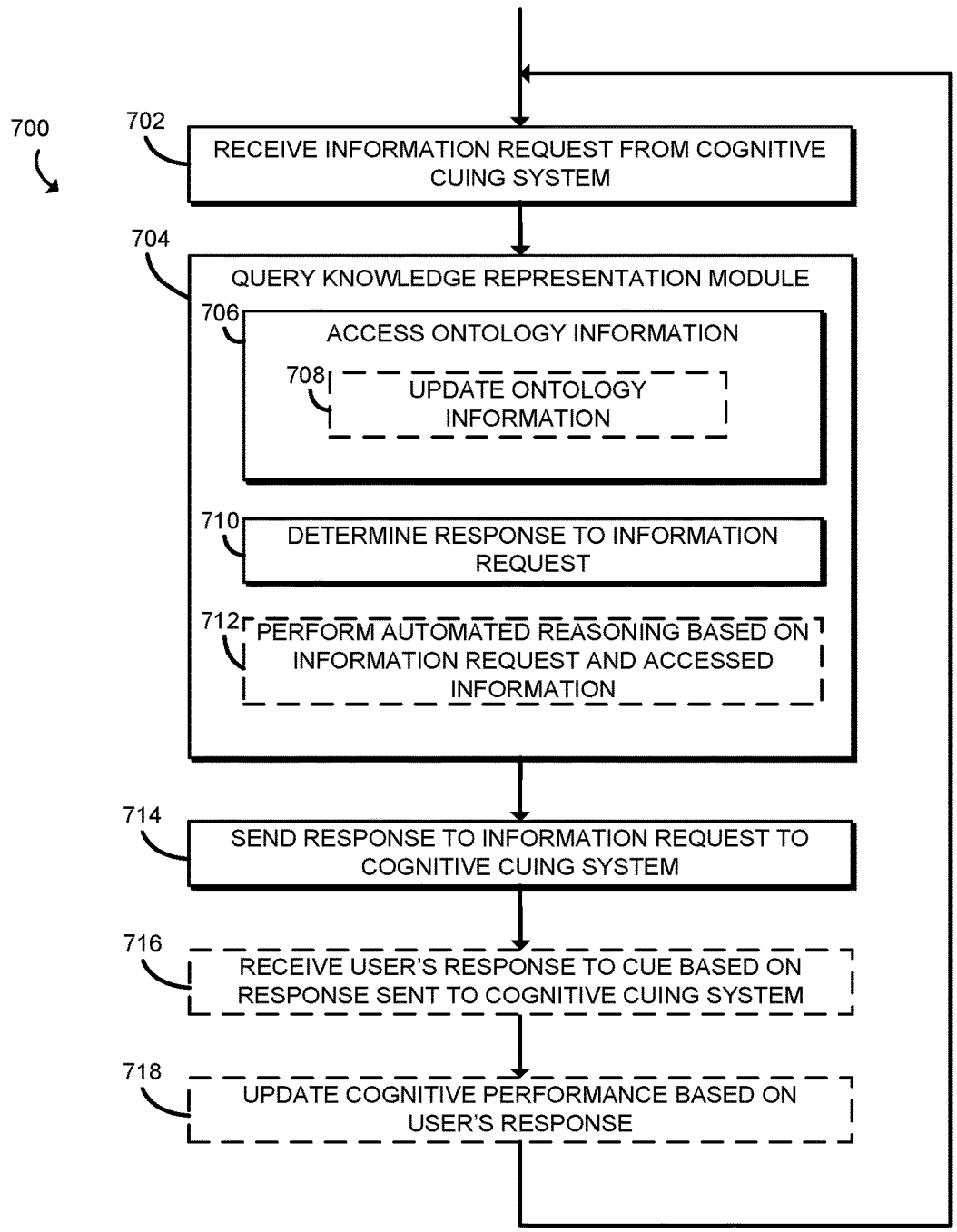
FIG. 7 is a simplified flow diagram of at least one embodiment of a method for providing information from a knowledge-based system that may be executed by the knowledge-based system device FIG. 3.

Referring now to FIG. 7, in use, the knowledge-based system 104 may execute a method 700 for providing information to the cognitive cuing system 102. The method 700 begins in block 702, in which the knowledge-based system 104 receives an information request from a cognitive cuing system 102. As described above, the information request may include a context of the user determined by the cognitive cuing system 102, and may include a request for specific information and/or general information related to the context.

In block 704, the knowledge-based system 104 queries the knowledge representation module 504 based on the information request. In block 706, the knowledge-based system 104 accesses the ontology information. Of course, as part of accessing the ontology information, the knowledge-based system 104 may access information related to the cognitive performance of the user. Optionally, the knowledge-representation module updates the ontology information based on the context received in block 708.

In block 710, the knowledge-based system 104 determines the response to the information request. In addition to directly answering the information request, the knowledge-based system 104 is able to be flexible in determining the response and may apply automated reasoning to determine a dynamic response to the information request. For example, the knowledge-based system 104 may analyze previous interactions the user has had with a certain person, and may suggest a topic of conversation to discuss with that person. In another example, the knowledge-based system 104 may be monitoring a conversation the user is involved in. The knowledge-based system 104 may recognize that the user has made a social error (such as using the wrong name of the person to whom the user is speaking), and may determine the response based on that recognition.

Additionally or alternatively, the knowledge-based system 104 may also include relational information in the response. Relational information may be embodied as any kind of information indicating a relationship between the user and the provided information, and/or any kind of information indicating a relationship between different elements of the provided information. For example, the information request may request the name of a person the user is speaking to. The knowledge-based system 104 may provide the name, and may also provide relational information indicating that the user has previously called this person by the wrong name. In another example, the user may have indicated a preference to be reminded of a certain person's name every time the user sees that person, and such a preference would be included in the response. In yet another example, the user may have set a reminder to be given a certain cue at a certain time, place, or situation, and such a reminder would be included in the response. In some cases, the knowledge-based system 104 may determine that the context included in the information request does not indicate that the user requires any particular information, and the response may so indicate (or, alternatively, the knowledge-based system 104 may not provide a response).

In some embodiments in block 712, the knowledge-based system 104 may perform automated reasoning based on information contained in the ontology and/or the provided context to determine information relevant to the information request. If new information is inferred, deduced, or otherwise determined during the automated reasoning, the ontology may be updated with the new information.

In block 714, the knowledge-based system 104 sends the response to the information request to the cognitive cuing system 102. Subsequently, in block 716, the knowledge-based system 104 may receive from the cognitive cuing system 102 the user's response to a cue that was based on the response sent to the cognitive cuing system 102. In such embodiments, the knowledge-based system 104 may update the user's past cognitive performance based on the user's response in block 718.

Referring now to FIG. 8, an illustrative entry 800 in an illustrative ontology is depicted. The entry 800 shows several properties of the entry 800, and the relationship between several of the properties.

EXAMPLES

Illustrative examples of the devices, systems, and methods disclosed herein are provided below. An embodiment of the devices, systems, and methods may include any one or more, and any combination of, the examples described below.

Example 1 includes a cognitive cuing system for cuing a user with information, the cognitive cuing system comprising a context determination module to obtain context data related to the user and determine a context of the user based on the context data; a communication module to (i) request, based on the context of the user, information from a knowledge-based system and (ii) receive the information from the knowledge-based system in response to the request; and a cuing module to (i) determine a cue to be provided to the user based on the information, (ii) determine a present user attention level, and (iii) provide the cue to the user based on the present user attention level.

Example 2 includes the subject matter of Example 1, and wherein the cuing module is further to determine a cue threshold of the cue, wherein to provide the cue to the user comprises to (i) determine whether the present attention level of the user satisfies the cue threshold and (ii) provide the cue to the user in response to a determination the present attention level of the user satisfies the cue threshold.

Example 3 includes the subject matter of any of Examples 1 and 2, and wherein to determine the cue threshold comprises to determine the cue threshold based on a past cognitive performance of the user.

Example 4 includes the subject matter of any of Examples 1-3, and wherein to determine the cue threshold comprises to determine the cue threshold based on a user preference.

Example 5 includes the subject matter of any of Examples 1-4, and wherein the user preference is indicative of a goal for cognitive improvement.

Example 6 includes the subject matter of any of Examples 1-5, and wherein to determine the present user attention level comprises to determine a present user attention level based on an activity of the user, a location of the user, or a social circumstance of the user.

Example 7 includes the subject matter of any of Examples 1-6, and wherein to determine the present user attention level comprises to determine whether the user is confused based on the context of the user.

Example 8 includes the subject matter of any of Examples 1-7, and wherein to determine the cue to be provided to the user based on the information comprises to determine a minimal effective cue to be provided to the user.

Example 9 includes the subject matter of any of Examples 1-8, and wherein to determine the minimal effective cue to be provided to the user comprises to determine a minimal effective cue to be provided to the user based on a past cognitive performance of the user.

Example 10 includes the subject matter of any of Examples 1-9, and wherein to determine the context of the user comprises to determine the context of the user based on data obtained from a biometric sensor.

Example 11 includes the subject matter of any of Examples 1-10, and wherein the context is indicative of a social error.

Example 12 includes the subject matter of any of Examples 1-11, and wherein to provide the cue to the user comprises to provide a visual cue to the user.

Example 13 includes the subject matter of any of Examples 1-12, and wherein to provide the cue to the user comprises to provide an auditory cue to the user.

Example 14 includes the subject matter of any of Examples 1-13, and wherein to provide the cue to the user comprises to provide a haptic notification to the user that the information is available.

Example 15 includes the subject matter of any of Examples 1-14, and wherein the information is related to a reminder previously provided by the user.

Example 16 includes the subject matter of any of Examples 1-15, and wherein the information comprises relational information.

Example 17 includes the subject matter of any of Examples 1-16, and wherein the information is related to a past cognitive performance of the user.

Example 18 includes the subject matter of any of Examples 1-17, and wherein the context is indicative of an activity of the user.

Example 19 includes the subject matter of any of Examples 1-18, and wherein the context is indicative of a location of the user.

Example 20 includes the subject matter of any of Examples 1-19, and wherein the context is indicative of a social circumstance of the user.

Example 21 includes the subject matter of any of Examples 1-20, and further including a feedback module to monitor a response of the user to the cue.

Example 22 includes the subject matter of any of Examples 1-21, and wherein the feedback module is further to provide the response to the knowledge-based system.

Example 23 includes the subject matter of any of Examples 1-22, and wherein the feedback module is further to determine, based on the response, at least one of (i) that the cue provided too little information to help the user, (ii) that the cue provided the right amount of information to help the user, and (iii) that the cue provided more information than the user required.

Example 24 includes the subject matter of any of Examples 1-23, and wherein the feedback module is further to provide a diagnostic relating to a cognitive performance of the user based on the response.

Example 25 includes the subject matter of any of Examples 1-24, and wherein the cognitive cuing system comprises the knowledge-based system.

Example 26 includes the subject matter of any of Examples 1-25, and wherein the knowledge-based system is to determine the information based on the context and a past cognitive performance of the user.

Example 27 includes a knowledge-based system comprising a communication module to (i) receive a request for information from a cognitive cuing system and (ii) send a response to the request to the cognitive cuing system; and a knowledge representation module to (i) access knowledge from an ontology managed by the knowledge-based system, wherein the ontology comprises data indicative of a past cognitive performance of a user of the cognitive cuing system and (ii) determine the response to the request based on the knowledge.

Example 28 includes the subject matter of Example 27, and wherein the response to the request comprises relational information.

Example 29 includes the subject matter of any of Examples 27 and 28, and wherein the communication module is further to receive, from the cognitive cuing system, an indication of a response of the user to a cue provided to the user based on the response to the request, and wherein the knowledge representation module is further to update the data indicative of the past cognitive performance based on the indication of the response of the user.

Example 30 includes the subject matter of any of Examples 27-29, and wherein the knowledge representation module is further to provide a diagnostic relating to a recent cognitive performance of the user based on the data indicative of the past cognitive performance.

Example 31 includes the subject matter of any of Examples 27-30, and wherein the knowledge representation module is further to determine, based on the response of the user, at least one of (i) that the cue provided too little information to help the user, (ii) that the cue provided the right amount of information to help the user, and (iii) that the cue provided more information than the user required.

Example 32 includes the subject matter of any of Examples 27-31, and wherein the knowledge representation module is further to perform automated reasoning based on the knowledge from the ontology and the request for information to infer new information.

Example 33 includes a method for cuing a user of a cognitive cuing system with information, the method comprising obtaining, by the cognitive cuing system, context data related to the user; determining, by the cognitive cuing system, a context of the user based on the context data; requesting, by the cognitive cuing system and based on the context of the user, information from a knowledge-based system; receiving, by the cognitive cuing system, the information from the knowledge-based system in response to the request; determining, by the cognitive cuing system and based on the information, a cue to be provided to the user; determining, by the cognitive cuing system, a present user attention level; and providing, by the cognitive cuing system and based on the present user attention level, the cue to the user.

Example 34 includes the subject matter of Example 33, and further including determining, by the cognitive cuing system, a cue threshold of the cue, wherein providing the cue to the user comprises (i) determining whether the present attention level of the user satisfies the cue threshold and (ii) providing the cue to the user in response to a determination the present attention level of the user satisfies the cue threshold.

Example 35 includes the subject matter of any of Examples 33 and 34, and wherein determining the cue threshold comprises determining the cue threshold based on a past cognitive performance of the user.

Example 36 includes the subject matter of any of Examples 33-35, and wherein determining the cue threshold comprises determining the cue threshold based on a user preference.

Example 37 includes the subject matter of any of Examples 33-36, and wherein the user preference is indicative of a goal for cognitive improvement.

Example 38 includes the subject matter of any of Examples 33-37, and wherein determining the present user attention level comprises determining a present user attention level based on an activity of the user, a location of the user, or a social circumstance of the user.

Example 39 includes the subject matter of any of Examples 33-38, and wherein determining the present user attention level comprises determining whether the user is confused based on the context of the user.

Example 40 includes the subject matter of any of Examples 33-39, and wherein determining the cue to be provided to the user based on the information comprises determining a minimal effective cue to be provided to the user.

Example 41 includes the subject matter of any of Examples 33-40, and wherein determining the minimal effective cue to be provided to the user comprises determining a minimal effective cue to be provided to the user based on a past cognitive performance of the user.

Example 42 includes the subject matter of any of Examples 33-41, and wherein determining the context of the user comprises determining the context of the user based on data obtained from a biometric sensor.

Example 43 includes the subject matter of any of Examples 33-42, and wherein the context is indicative of a social error.

Example 44 includes the subject matter of any of Examples 33-43, and wherein providing the cue to the user comprises providing a visual cue to the user.

Example 45 includes the subject matter of any of Examples 33-44, and wherein providing the cue to the user comprises providing an auditory cue to the user.

Example 46 includes the subject matter of any of Examples 33-45, and wherein providing the cue to the user comprises providing a haptic notification to the user that the information is available.

Example 47 includes the subject matter of any of Examples 33-46, and wherein the information is related to a reminder previously provided by the user.

Example 48 includes the subject matter of any of Examples 33-47, and wherein the information comprises relational information.

Example 49 includes the subject matter of any of Examples 33-48, and wherein the information is related to a past cognitive performance of the user.

Example 50 includes the subject matter of any of Examples 33-49, and wherein the context is indicative of an activity of the user.

Example 51 includes the subject matter of any of Examples 33-50, and wherein the context is indicative of a location of the user.

Example 52 includes the subject matter of any of Examples 33-51, and wherein the context is indicative of a social circumstance of the user.

Example 53 includes the subject matter of any of Examples 33-52, and further including monitoring, by the cognitive cuing system, a response of the user to the cue.

Example 54 includes the subject matter of any of Examples 33-53, and further including providing, by the cognitive cuing system, the response to the knowledge-based system.

Example 55 includes the subject matter of any of Examples 33-54, and further including determining, by the cognitive cuing system and based on the response, at least one of (i) that the cue provided too little information to help the user, (ii) that the cue provided the right amount of information to help the user, and (iii) that the cue provided more information than the user required.

Example 56 includes the subject matter of any of Examples 33-55, and further including providing, by the cognitive cuing system, a diagnostic related to a cognitive performance of the user based on the response.

Example 56 includes the subject matter of any of Examples 33-56, and wherein the cognitive cuing system comprises the knowledge-based system.

Example 58 includes the subject matter of any of Examples 33-57, and further including determining, by the knowledge-based system and based on the context and a past cognitive performance of the user, the information.

Example 59 includes a method for providing information to a cognitive cuing system by a knowledge-based system, the method comprising receiving, by the knowledge-based system, a request for information; accessing, by the knowledge-based system, knowledge from an ontology managed by the knowledge-based system, wherein the ontology comprises data indicative of a past cognitive performance of a user of the cognitive cuing system; determining, by the knowledge-based system, a response to the request based on the knowledge; and sending, by the knowledge-based system, the response to the request to the cognitive cuing system.

Example 60 includes the subject matter of Example 59, and wherein the response to the request comprises relational information.

Example 61 includes the subject matter of any of Examples 59 and 60, and further including receiving, by the knowledge-based system and from the cognitive cuing system, an indication of a response of the user to a cue provided to the user based on the response to the request, and updating, by the knowledge-based system, the data indicative of the past cognitive performance based on the indication of the response of the user.

Example 62 includes the subject matter of any of Examples 59-61, and further including providing, by the knowledge-based system, a diagnostic relating to a recent cognitive performance of the user based on the data indicative of the past cognitive performance.

Example 63 includes the subject matter of any of Examples 59-62, and further including determining, by the knowledge-based system and based on the response of the user, at least one of (i) that the cue provided too little information to help the user, (ii) that the cue provided the right amount of information to help the user, and (iii) that the cue provided more information than the user required.

Example 64 includes the subject matter of any of Examples 59-63, and further including performing, by the knowledge-based system, automated reasoning based on the knowledge from the ontology and the request for information to infer new information.

Example 65 includes one or more machine-readable storage media comprising a plurality of instructions stored thereon that in response to being executed result in a computing device performing the method of any of Examples 33-64.

Example 66 includes a cognitive cuing system for cuing a user with information, the cognitive cuing system comprising means for obtaining context data related to the user; means for determining a context of the user based on the context data; means for requesting, based on the context of the user, information from a knowledge-based system; means for receiving the information from the knowledge-based system in response to the request; means for determining, based on the information, a cue to be provided to the user; means for determining a present user attention level; and means for providing, based on the present user attention level, the cue to the user.

Example 67 includes the subject matter of Example 66, and further including means for determining a cue threshold of the cue, wherein the means for providing the cue to the user comprises (i) means for determining whether the present attention level of the user satisfies the cue threshold and (ii) means for providing the cue to the user in response to a determination the present attention level of the user satisfies the cue threshold.

Example 68 includes the subject matter of any of Examples 66 and 67, and wherein the means for determining the cue threshold comprises means for determining the cue threshold based on a past cognitive performance of the user.

Example 69 includes the subject matter of any of Examples 66-68, and wherein the means for determining the cue threshold comprises means for determining the cue threshold based on a user preference.

Example 70 includes the subject matter of any of Examples 66-69, and wherein the user preference is indicative of a goal for cognitive improvement.

Example 71 includes the subject matter of any of Examples 66-70, and wherein the means for determining the present user attention level comprises means for determining a present user attention level based on an activity of the user, a location of the user, or a social circumstance of the user.

Example 72 includes the subject matter of any of Examples 66-71, and wherein the means for determining the present user attention level comprises means for determining whether the user is confused based on the context of the user.

Example 73 includes the subject matter of any of Examples 66-72, and wherein the means for determining the cue to be provided to the user based on the information comprises means for determining a minimal effective cue to be provided to the user.

Example 74 includes the subject matter of any of Examples 66-73, and wherein the means for determining the minimal effective cue to be provided to the user comprises means for determining a minimal effective cue to be provided to the user based on a past cognitive performance of the user.

Example 75 includes the subject matter of any of Examples 66-74, and wherein the means for determining the context of the user comprises means for determining the context of the user based on data obtained from a biometric sensor.

Example 76 includes the subject matter of any of Examples 66-75, and wherein the context is indicative of a social error.

Example 77 includes the subject matter of any of Examples 66-76, and wherein the means for providing the cue to the user comprises means for providing a visual cue to the user.

Example 78 includes the subject matter of any of Examples 66-77, and wherein the means for providing the cue to the user comprises means for providing an auditory cue to the user.

Example 79 includes the subject matter of any of Examples 66-78, and wherein the means for providing the cue to the user comprises means for providing a haptic notification to the user that the information is available.

Example 80 includes the subject matter of any of Examples 66-79, and wherein the information is related to a reminder previously provided by the user.

Example 81 includes the subject matter of any of Examples 66-80, and wherein the information comprises relational information.

Example 82 includes the subject matter of any of Examples 66-81, and wherein the information is related to a past cognitive performance of the user.

Example 83 includes the subject matter of any of Examples 66-82, and wherein the context is indicative of an activity of the user.

Example 84 includes the subject matter of any of Examples 66-83, and wherein the context is indicative of a location of the user.

Example 85 includes the subject matter of any of Examples 66-84, and wherein the context is indicative of a social circumstance of the user.

Example 86 includes the subject matter of any of Examples 66-85, and further including means for monitoring a response of the user to the cue.

Example 87 includes the subject matter of any of Examples 66-86, and further including means for providing the response to the knowledge-based system.

Example 88 includes the subject matter of any of Examples 66-87, and further including means for determining, based on the response, at least one of (i) that the cue provided too little information to help the user, (ii) that the cue provided the right amount of information to help the user, and (iii) that the cue provided more information than the user required.

Example 89 includes the subject matter of any of Examples 66-88, and further including means for providing, by the cognitive cuing system, a diagnostic related to a cognitive performance of the user based on the response.

Example 90 includes the subject matter of any of Examples 66-89, and wherein the cognitive cuing system comprises the knowledge-based system.

Example 91 includes the subject matter of any of Examples 66-90, and further including means for determining, by the knowledge-based system and based on the context and a past cognitive performance of the user, the information.

Example 92 includes a knowledge-based system for providing information to a cognitive cuing system, the knowledge-based system comprising means for receiving a request for information; means for accessing knowledge from an ontology managed by the knowledge-based system, wherein the ontology comprises data indicative of a past cognitive performance of a user of the cognitive cuing system; means for determining a response to the request based on the knowledge; and means for sending the response to the request to the cognitive cuing system.

Example 93 includes the subject matter of Example 92, and wherein the response to the request comprises relational information.

Example 94 includes the subject matter of any of Examples 92 and 93, and further including means for receiving, from the cognitive cuing system, an indication of a response of the user to a cue provided to the user based on the response to the request, and means for updating the data indicative of the past cognitive performance based on the indication of the response of the user.

Example 95 includes the subject matter of any of Examples 92-94, and further including means for providing a diagnostic relating to a recent cognitive performance of the user based on the data indicative of the past cognitive performance.

Example 96 includes the subject matter of any of Examples 92-95, and further including means for determining, based on the response of the user, at least one of (i) that the cue provided too little information to help the user, (ii) that the cue provided the right amount of information to help the user, and (iii) that the cue provided more information than the user required.

Example 97 includes the subject matter of any of Examples 92-96, and further including means for performing automated reasoning based on the knowledge from the ontology and the request for information to infer new information.

The invention claimed is:

1. A cognitive cuing system comprising:
a context determination circuitry to obtain context data related to a user of the cognitive cuing system and determine a context of the user based on the context data;
a communication circuitry to (i) request, based on the context of the user, information from a knowledge-based system and (ii) receive the information from the knowledge-based system in response to the request; and
a cuing circuitry to (i) determine a minimal effective cue comprising a minimum threshold amount of information to be provided to the user based on the information, wherein the minimal effective cue represents a minimum amount of information needed to prompt the user in a particular situation, (ii) determine a present user attention level, and (iii) provide the minimal effective cue to the user based on the present user attention level.

2. The cognitive cuing system of claim 1, wherein the cuing circuitry is further to determine a cue threshold of the cue, wherein to provide the cue to the user comprises to (i) determine whether the present attention level of the user satisfies the cue threshold and (ii) provide the cue to the user in response to a determination the present attention level of the user satisfies the cue threshold.

3. The cognitive cuing system of claim 2, wherein to determine the cue threshold comprises to determine the cue threshold based on at least one of a past cognitive performance of the user and a user preference.

4. The cognitive cuing system of claim 3, wherein the user preference is indicative of a goal for cognitive improvement.

5. The cognitive cuing system of claim 1, wherein to determine the present user attention level comprises to determine a present user attention level based on an activity of the user, a location of the user, or a social circumstance of the user.

6. The cognitive cuing system of claim 1, wherein to determine the present user attention level comprises to determine whether the user is confused based on the context of the user.

7. The cognitive cuing system of claim 1, wherein to determine the context of the user comprises to determine the context of the user based on data electronically measured by a biometric sensor.

8. The cognitive cuing system of claim 1, wherein the context is indicative of a social error when interacting in a social context.

9. The cognitive cuing system of claim 1, wherein the information comprises relational information.

10. The cognitive cuing system of claim 1, further comprising a feedback module to monitor a response of the user to the minimal effective cue.

11. The cognitive cuing system of claim 10, wherein the feedback circuitry is further to determine, based on the response, at least one of (i) that the minimal effective cue provided too little information to help the user, (ii) that the minimal effective cue provided the right amount of information to help the user, and (iii) that the minimal effective cue provided more information than the user required.

12. One or more non-transitory, machine-readable storage media comprising a plurality of instructions stored thereon that, when executed, cause a cognitive cuing system to:
    obtain context data related to the user and determine a context of the user based on the context data;
    request, based on the context of the user, information from a knowledge-based system;
    receive the information from the knowledge-based system in response to the request;
    determine a minimal effective cue comprising a minimum threshold amount of information to be provided to the user based on the information, wherein the minimal effective cue represents a minimum amount of information needed to prompt the user in a particular situation;
    determine a present user attention level; and
    provide the minimal effective cue to the user based on the present user attention level.

13. The one or more non-transitory, machine-readable storage media of claim 12, wherein the plurality of instructions further cause the cognitive cuing system to determine a cue threshold of the cue, wherein to provide the cue to the user comprises to (i) determine whether the present attention level of the user satisfies the cue threshold and (ii) provide the cue to the user in response to a determination the present attention level of the user satisfies the cue threshold.

14. The one or more non-transitory, machine-readable storage media of claim 13, wherein to determine the cue threshold comprises to determine the cue threshold based on at least one of a past cognitive performance of the user and a user preference.

15. The one or more non-transitory, machine-readable storage media of claim 13, wherein to determine the present user attention level comprises to determine a present user attention level based on an activity of the user, a location of the user, or a social circumstance of the user.

16. The one or more non-transitory, machine-readable storage media of claim 13, further comprising a feedback module to monitor a response of the user to the cue.

17. The one or more non-transitory, machine-readable storage media of claim 16, wherein the feedback module is further to determine, based on the response, at least one of (i) that the cue provided too little information to help the user, (ii) that the cue provided the right amount of information to help the user, and (iii) that the cue provided more information than the user required.

18. A method comprising:
    obtaining, by a cognitive cuing system, context data related to a user of the cognitive cuing system;
    determining, by the cognitive cuing system, a context of the user based on the context data;
    requesting, by the cognitive cuing system and based on the context of the user, information from a knowledge-based system;
    receiving, by the cognitive cuing system, the information from the knowledge-based system in response to the request;
    determining, by the cognitive cuing system and based on the information, a minimal effective cue comprising a minimum threshold amount of information to be provided to the user, wherein the minimal effective cue represents a minimum amount of information needed to prompt the user in a particular situation;
    determining, by the cognitive cuing system, a present user attention level; and
    providing, by the cognitive cuing system and based on the present user attention level, the minimal effective cue to the user.

19. The method of claim 18, wherein determining the present user attention level comprises determining a present user attention level based on an activity of the user, a location of the user, or a social circumstance of the user.

* * * * *